US007931305B2

(12) United States Patent
Tompkin et al.

(10) Patent No.: US 7,931,305 B2
(45) Date of Patent: Apr. 26, 2011

(54) SECURITY DOCUMENT WITH TRANSPARENT WINDOWS

(75) Inventors: Wayne Robert Tompkin, Baden (CH); Andreas Schilling, Hagendorn (CH)

(73) Assignee: OVD Kinegram AG, Zug (CH)

( * ) Notice: Subject to any disclaimer, the term of this patent is extended or adjusted under 35 U.S.C. 154(b) by 961 days.

(21) Appl. No.: 11/662,147

(22) PCT Filed: Sep. 7, 2005

(86) PCT No.: PCT/EP2005/009584

§ 371 (c)(1),
(2), (4) Date: Jun. 8, 2007

(87) PCT Pub. No.: WO2006/029745

PCT Pub. Date: Mar. 23, 2006

(65) Prior Publication Data

US 2008/0106091 A1 May 8, 2008

(30) Foreign Application Priority Data

Sep. 15, 2004 (DE) ........................ 10 2004 044 459

(51) Int. Cl.
*B42D 15/00* (2006.01)
*B42D 15/10* (2006.01)
*G09C 3/00* (2006.01)

(52) U.S. Cl. ................ 283/98; 283/70; 283/72; 283/74; 283/94; 283/99; 283/901

(58) Field of Classification Search .................... 40/446, 40/454; 283/67, 70, 72, 74, 94, 98, 99, 117, 283/901; 380/54, 59; 382/100, 135, 137, 382/138, 139, 140, 321, 325
See application file for complete search history.

(56) References Cited

U.S. PATENT DOCUMENTS 4,498,736 A 2/1985 Griffin
5,995,638 A 11/1999 Amidfor
6,381,071 B1 4/2002 Dona et al.
6,819,775 B2 * 11/2004 Amidror et al. .............. 382/100
7,194,105 B2 3/2007 Hersch et al.
7,227,690 B2 6/2007 Schilling et al.
2002/0117845 A1 * 8/2002 Ahlers et al. .................... 283/72
2003/0169468 A1 9/2003 Menz et al.
2003/0193184 A1 * 10/2003 Taylor et al. .................... 283/72
2005/0180016 A1 8/2005 Wild et al.

(Continued)

FOREIGN PATENT DOCUMENTS

DE 19729918 1/1999

(Continued)

*Primary Examiner* — Dana Ross
*Assistant Examiner* — Justin V Lewis
(74) *Attorney, Agent, or Firm* — Hoffmann & Baron, LLP

(57) ABSTRACT

The invention concerns a security document (1) comprising a transparent window (12) in which a first optical element (15) is arranged and a second transparent window (13) in which a second optical element (16) is arranged. The first transparent window (12) and the second transparent window (13) are arranged on a carrier (11) of the security document (1) in mutually spaced relationship in such a way that the first and the second optical elements (15, 16) can be brought into overlapping relationship with each other. The first optical element (15) has a first transmissive microlens field and the second optical element (16) has a second transmissive microlens field, wherein a first optical effect is produced upon overlap of the second microlens field with the first microlens field.

17 Claims, 6 Drawing Sheets

U.S. PATENT DOCUMENTS

| | | | | |
|---|---|---|---|---|
| 2007/0246931 | A1* | 10/2007 | Hansen et al. | 283/83 |
| 2009/0201586 | A1 | 8/2009 | Wild et al. | |

FOREIGN PATENT DOCUMENTS

| | | | |
|---|---|---|---|
| DE | 10040785 | | 3/2002 |
| DE | 10254499 | | 6/2004 |
| EP | 1 127 712 | | 8/2001 |
| WO | WO 98/15418 | | 4/1998 |
| WO | WO 02/101669 | | 12/2002 |
| WO | WO 03/086775 | | 10/2003 |
| WO | WO03095227 | A1 | 11/2003 |
| WO | WO03105065 | A1 | 12/2003 |
| WO | WO 2004/036507 | | 4/2004 |

* cited by examiner

SECURITY DOCUMENT WITH TRANSPARENT WINDOWS

This application claims priority based on an International Application filed under the Patent Cooperation Treaty, PCT/EP2005/009584, filed on Sep. 7, 2005 and German Application No. 102004044459.5, filed on Sep. 15, 2004.

FIELD OF THE INVENTION

The invention concerns a security document, in particular a banknote or identity card, having a first optical element and having a transparent window in which a second optical element is arranged, wherein the first and second optical elements are arranged on a carrier of the security document in mutually spaced relationship in such a way that the first and second optical elements can be brought into overlap with each other.

BACKGROUND OF THE INVENTION

Thus EP 0 930 979 B1 discloses a self-checking banknote which comprises a flexible plastic carrier. The flexible plastic carrier comprises a transparent material and is provided with a clouded sheathing which leaves a clear transparent surface free as a window.

A magnification lens is arranged in the window as a verification means. In addition provided on the banknote is a microprint region which manifests a small character, a fine line or a filigree pattern. Now, to check or inspect the banknote the banknote is folded and thus the transparent window and the microprint region are brought into overlapping relationship. The magnification lens can now be used to make the microprint visible to the viewer and thus verify the banknote.

Alternatively EP 0 930 979 B1 proposes arranging in the transparent window a distorting lens, an optical filter or a polarisation filter.

SUMMARY OF THE INVENTION

Now the object of the invention is to provide an improved security document.

That object is attained by a security document which is provided with a first transparent window in which a first optical element is arranged and a second transparent window in which a second optical element is arranged, wherein the first transparent window and the second transparent window are arranged on a carrier of the security document in mutually spaced relationship in such a way that the first and the second optical elements can be brought into overlapping relationship with each other and wherein the first optical element has a first transmissive microlens field and the second optical element has a second transmissive microlens field, wherein a first optical effect is produced upon overlap of the second microlens field with the first microlens field.

Upon overlap of the first microlens field with the second microlens field striking, easily remembered optical effects which can be imitated only with very great difficulty by means of other technologies and which moreover are also heavily dependent on the spacing between the mutually overlapping first and second microlens fields are produced. By virtue of those properties of the first optical effect which occurs upon overlap of the first and second microlens fields, when the microlens fields are arranged in the transparent windows of a security document, the user is afforded the option of checking the authenticity of the security document by means of clear and striking security features. By virtue thereof the invention thus makes it possible to produce security documents which can be easily checked and which can only be imitated with difficulty.

Advantageous configurations of the invention are set forth in the appendant claims.

In accordance with a preferred embodiment of the invention the lens spacing of the microlenses of the first microlens field and the lens spacing of the microlenses of the second microlens field are so selected that the individual light beams of the light ray which is split up by the mutually superposed microlens fields meet at a common pixel. In that respect lens spacing of the microlenses means the lateral spacing of the microlenses of the respective microlens field or array. That provides that superpositioning of the two microlens fields produces an integral image and thus the overall system behaves approximately like an individual macroscopic lens, the properties of which however differ markedly from those of a conventional macroscopic lens. A system of that kind can produce both real and also virtual images, individual images but also multiple images.

So that a macroscopic lens of similar effect is produced upon superpositioning of the first and second microlens fields, the lens spacing of the microlenses of the two microlens fields is preferably so selected that the change in the displacement of the mutually associated lenses of the first and second microlens fields, starting from the optical axis of the virtual macroscopic lens, is constant. In accordance with a preferred embodiment of the invention that is achieved by two microlens fields in which the microlenses are respectively spaced from each other in accordance with a periodic raster with a constant lens spacing and in that case the lens spacing of the microlenses of the first microlens field differs from the lens spacing of the microlenses of the second microlens field. Microlens fields of that kind can be particularly easily produced. Preferably in that respect the lens spacing of the microlenses of the first microlens field is an integral multiple of the lens spacing of the microlenses of the second microlens field.

In order to be able to achieve an integral image with a high level of resolution by overlapping of the microlens fields, it is advantageous in that respect for the diameter of the microlenses to be selected to be less than the resolution capability of the human eye so that the lens spacing of the microlenses of the first and second microlens fields is preferably to be selected to be less than 300 μm. Further for that purpose the focal length of the microlenses is to be selected to be small in comparison with the image and object distance.

It is possible in that respect for the first microlens field to be made up of a plurality of microlenses of positive focal length and for the second microlens field to be made up of a plurality of microlenses of positive focal length which co-operate in the manner of a Kepler telescope in the imaging of the plurality of split-up light beams. With such a configuration for the microlens fields, it is possible to achieve an optical effect which is similar to a macroscopic lens system but which has properties which differ markedly from those of a conventional lens system. It is thus possible to achieve particularly striking and thus easily remembered optical effects.

Furthermore it is also possible for the first microlens field to be made up of a plurality of microlenses of positive focal length and for the second microlens field to be made up of a plurality of microlenses of negative focal length, which co-operate in the manner of a Gallileo telescope. In this case also, when the first and second microlens fields are in mutually superposed relationship, it is possible to achieve effects which are similar to those of a macroscopic lens but differ from a conventional macroscopic lens system.

In accordance with a further preferred embodiment of the invention the two microlens fields are not homogenous and have locally different parameters such as lens spacing, diameter of the lenses or focal length of the lenses. By virtue of a lateral displacement, various microlens combinations and thus various optical functions can thus be produced, whereby novel and easily remembered further security features can be integrated into the security document.

Preferably here one or more parameters of the first and/or second microlens field change periodically in accordance with a (common) raster. Furthermore parameters of the microlens fields can also vary virtually continuously in a predetermined fashion.

Thus it is possible for example for items of information to be introduced at least in a microlens field by the microlens field having two or more regions involving differing lens spacing in respect of the microlenses and/or differing focal length in respect of the microlenses. Upon overlapping of the microlens fields the resulting imaging function differs in the first and second regions, whereby the information encoded into the change in the parameters of the microlens fields is rendered visible to the viewer.

Furthermore it is also possible for items of information which are concealed by phase displacement of the lens spacing of microlenses with respect to a periodic basic raster to be encoded into one or more microlens fields in the manner of a moiré pattern and for those items of information to be rendered visible upon superpositioning of the first and second microlens fields.

The forgery-proof nature of the security document can be further improved by the above-described measures for encoding additional items of information in the first and second microlens fields.

In accordance with a further preferred embodiment of the invention the security element has an opaque third optical element, wherein upon overlap of the first and/or the second microlens field with the third optical element one or more further optical effects are produced. In addition to the primary security feature which is generated by the overlapping of the two microlens fields, additional security features can thus be generated by the overlapping of the microlens fields, for example with a reflective optical variable element or with a high-resolution printing, in which case the microlens field can serve for example as a moiré analyser.

In accordance with a further preferred embodiment of the invention the first and/or the second optical element respectively comprises two microlens subfields which are arranged one over the other in the first and the second optical element respectively. The two microlens subfields are thus arranged for example on opposite sides of a film and thus form oppositely disposed microlens surfaces of a film. Thus for example the one surface of the first optical element is determined by the geometry of the one microlens subfield and the surface of the first optical element, which is opposite said surface, is determined by the geometry of the other microlens subfield. If now the geometry of a microlens subfield of the one optical element extinguishes the geometry of a microlens subfield of the second optical element, then the optical effect generated upon superpositioning of the first and second optical elements is dependent on the orientation of the first and the second optical elements, that is to say dependent on whether the security document is folded or bent in one direction or the other in order to bring the transparent windows into the overlapping relationship.

A similar effect can also be achieved by the microlens fields being arranged in the transparent windows of the security document in such a way that the spacing between the lenses of the two microlens fields changes in dependence on the folding or bending direction.

Preferably the first and/or the second optical element has a replication lacquer layer in which a relief structure which forms the first or the second microlens field respectively is shaped. In addition here encapsulation of the relief structure by means of an additional optical separation layer and/or shaping of the relief structure by means of UV replication has been found to be advantageous.

In this case the microlenses of the first and/or second microlens field are preferably formed by a relief structure which has an optical-diffraction effect and which by optical-diffraction means produces the effect of a microlens field. Such "diffractive lenses" can be formed by a diffractive binary relief structure, the profile depth of which is less than the wavelength of visible light (binary, thin diffractive lens), by a continuous diffractive relief profile of a profile depth less than the wavelength of visible light (thin diffractive lens with a continuous profile) and a diffractive continuous relief profile with a profile depth greater than the wavelength of visible light (thick diffractive lens with a continuous relief profile). It is however also possible for the microlens field to be shaped in the replication lacquer layer in the form of a refractively acting macrostructure which has a continuous steady surface profile without sudden changes. In that case the profile depth of that macrostructure is a multiple greater than the wavelength of visible light.

Preferably the first and/or the second optical elements are formed by the transfer layer of a transfer film. That makes it possible to satisfy the demands in terms of the quality of the microlens fields as well as the tolerances in respect of spacings, flatness and so forth.

BRIEF DESCRIPTION OF THE DRAWINGS

The invention is described by way of example hereinafter by means of a number of embodiments with reference to the accompanying drawings in which.

DETAILED DESCRIPTION OF THE INVENTION

Figure 1:
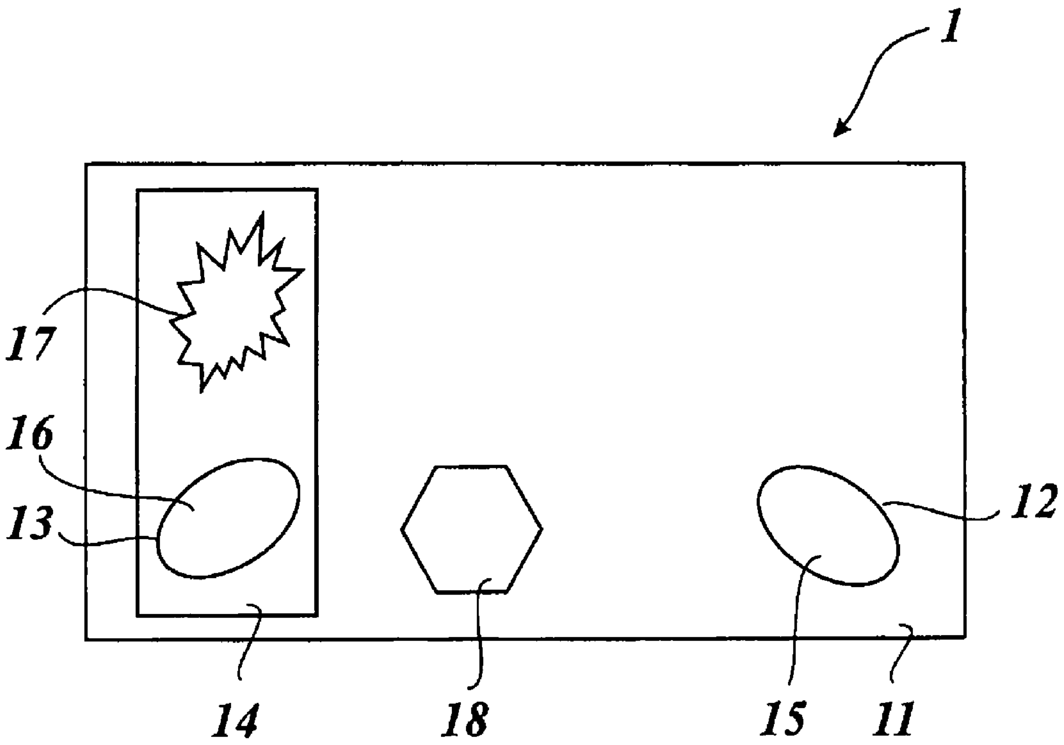
FIG. 1 shows a view of a security document according to the invention.

FIG. 1 shows a value-bearing document 1, for example a banknote or a cheque. It is however also possible for the value-bearing document 1 to represent an identification document, for example an identity card or pass.

The security document 1 comprises a flexible carrier 11 with transparent windows 12 and 13. The carrier 11 is preferably a carrier of paper material which is provided with a printing thereon and in which further security features, for example watermarks or security threads, are provided. Then, openings in window form are introduced into that paper carrier for example by stamping or by means of a laser, thereby affording the transparent windows 12 and 13 shown in FIG. 1. The transparent windows 12 and 13 are then closed again by optical elements which have a transmissive microlens field or array. Accordingly, a first transmissive microlens field 15 is arranged in the region of the transparent window 12 and a second transmissive microlens field 16 is arranged in the region of the transparent window 13.

It is however also possible for the carrier 11 to be a plastic film or a laminate comprising one or more paper and plastic material layers. Thus it is also possible that a transparent or partially transparent material is already used as the material for the carrier 11 and thus the carrier does not need to be partially removed by stamping or cutting to generate the transparent windows 12 and 13. That is the case for example if the carrier 11 comprises a transparent plastic film which is not provided with a clouding in the region of the transparent windows 12 and 13. Furthermore it is also possible for the transparent windows 12 and 13 to be already produced in the paper production procedure and for the optical elements with the transparent microlens fields 15 and 16 to be introduced into the carrier 11 in the manner of a security thread.

Furthermore it is also possible for the carrier 11—for example in the case of a passport—to comprise two pages which are joined together by adhesive or stitching.

As shown in FIG. 1 a strip-shaped patch 14 is further applied to the carrier 11, which covers over the region of the transparent window 13. The transparent microlens field or array 16 is introduced into the patch 14. The patch 14 is preferably the transfer layer of a transfer film, for example a hot stamping film, which is joined to the carrier 11 under the effect of pressure and heat by means of an adhesive layer. As shown in FIG. 1, besides the transmissive microlens field 16 which is arranged in the region of the transparent window 13, the patch 14 can also have one or more further optical elements, for example the further optical element 17 shown in FIG. 1. The optical element 17 is for example a diffraction grating, a hologram, a Kinegram®, partial metallisation, an HRI layer (HRI=high refraction index), an interference layer system, a crosslinked liquid crystal layer or an imprint implemented with effect pigment.

Furthermore it is also possible for the transparent window 12 not to be introduced into the carrier 11 at the position shown in FIG. 1, but also incorporated into the carrier 11 in the region of the strip-shaped patch 14 so the strip-shaped patch covers both transparent windows 12 and 13. Both microlens fields 15 and 16 can thus be introduced into a common film element, whereby production of the value-bearing document 1 is considerably improved.

The security document 1 can also have further security features which are applied for example by means of a transfer film and which can be brought into overlapping relationship with the transparent windows 12 and 13 by bending, folding or turning the carrier 11. Thus FIG. 1 shows by way of example a further optical element 18 which is preferably a reflective, optically variable element or a security imprint.

Figure 2:
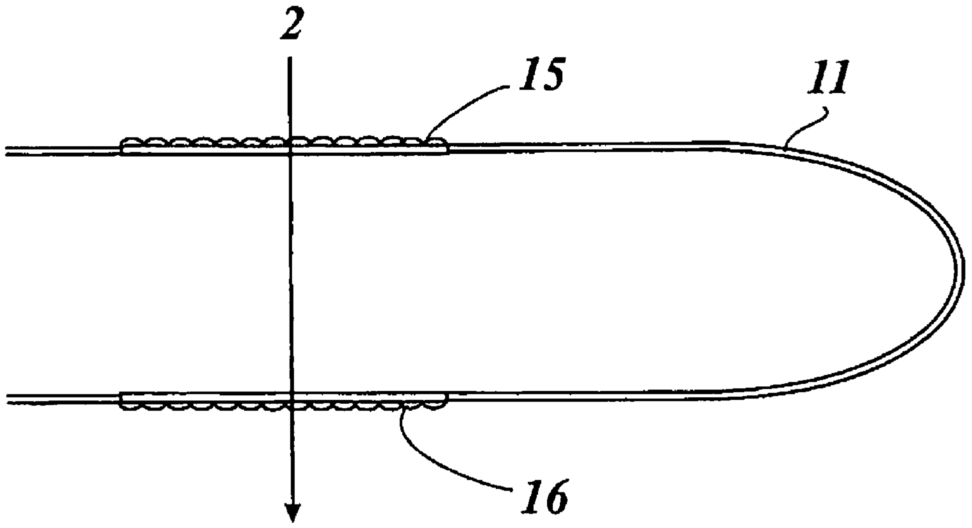
FIG. 2 shows a diagrammatic sectional view which is not true to scale of the security document of FIG. 1 in a viewing situation in which the security document is folded for overlap of the transparent windows.

For the purposes of verifying the security document 1 the transparent windows 12 and 13 of the carrier 11 are brought into the overlapping relationship, for example by folding the carrier 11, so that the microlens fields 15 and 16 are overlapping, as shown in FIG. 2. Then the optical effect produced upon viewing through the two microlens fields 15 arranged one over the other and 16 is checked. Thus for example an object disposed in the viewing direction 2, any graphic representation or a special verification pattern is viewed through the transmissive microlens fields 15 and 16. In addition it is also possible for an optical element of the security document 1 to be placed in the viewing direction by further folding of the security document 1, and viewed through the transparent microlens fields 15 and 16.

The optical effects which are produced when viewing an object through the transmissive microlens fields 15 and 16 will now be described with reference to FIGS. 3*a* and 3*b*.

Figure 3A:
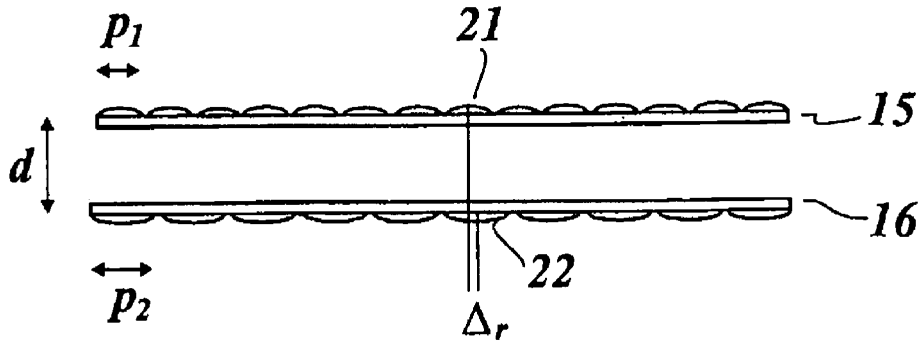
FIG. 3*a* shows a diagrammatic view of two mutually overlapping microlens fields of the security document of FIG. 1.

FIG. 3*a* shows a portion of the microlens fields 15 and 16 which are arranged relative to each other at a spacing d from each other in the viewing situation shown in FIG. 2.

Figure 3B:
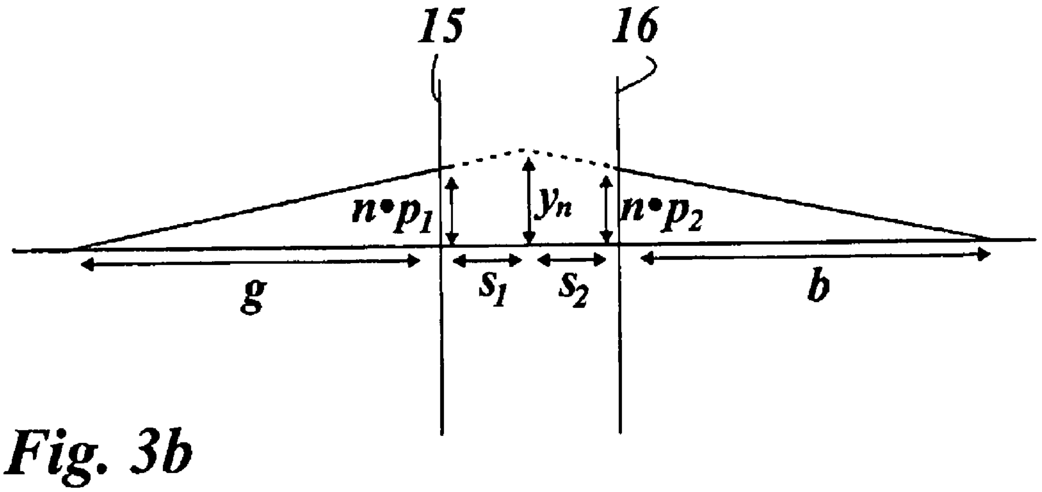
FIG. 3*b* shows a sketch to illustrate the optical effects which occur upon overlapping of the microlens fields shown in FIG. 3*a*.
Figure 3C:
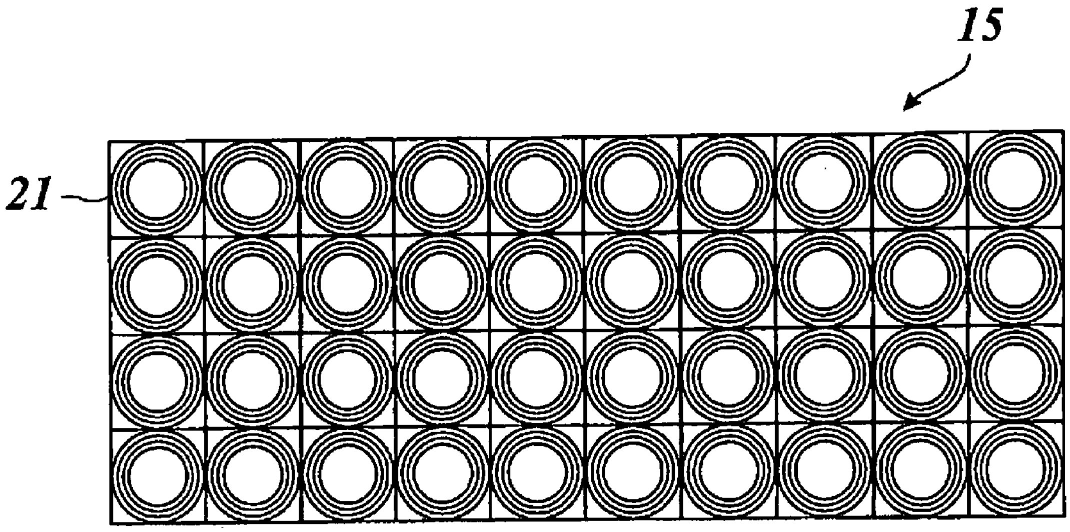
FIG. 3*c* shows a diagrammatic plan view of a microlens field as shown in FIG. 3*a*.

The microlens field 15 comprises a plurality of microlenses 21 which—as indicated in FIG. 3*c*—are arranged in mutually juxtaposed relationship. The microlens field 16 comprises a plurality of microlenses 22. If now two lenses 21 and 22 which are associated with each other and which are spaced at a spacing r from a notional optical axis of the system formed by the microlens fields 15 and 16 are viewed, their parallel optical axes have a deviation $\Delta_r$. On the assumption that the spacing of the two microlens fields corresponds to the sum of the focal lengths of the microlenses 21 and 22 then the parallel light beams which are incident at a angle α are focussed onto a point which is spaced at $f_{1\alpha}$ from the axis of the lens 21, wherein $f_1$ is the focal length of the lens 21. By virtue of the displacement $\Delta_r$ between the lenses 21 and 22 the light beam then passes at an angle β through the lens 22, wherein $$\beta = \frac{f_{1\alpha} - \Delta}{f_2}$$

and $f_2$ is the focal length of the lens 22. If now the case is considered where the source of a light ray is at a distance u from the microlens field 15 and the lens 21 occupies the radial position r, then the lateral position y of the light beam is at a spacing x from the microlens 22 r−βx, whereby the following results from the foregoing equation and by replacement of the angle α by α=r/u:

$$= r - \frac{x}{f_2}\left[\frac{r}{u}f_1 - \Delta_r\right] = r\left[1 - \frac{xf_1}{uf_2}\right] + \frac{x\Delta_r}{f_2}$$

So that all partial rays which are split up by the microlens fields 15 and 16, after passing through the microlens fields 15 and 16, are focussed onto the same point, it is necessary for y to be independent of r. On the assumption that the object distance is infinite and the image distance corresponds to the focal length, the following thus applies for the focal length F of the arrangement shown in FIG. 3*a* of the two microlens fields 15 and 16:

$$F = \frac{f_2}{\partial \Delta_r / \partial r}$$

That means that the focal length F of the imaging system formed by the microlens fields 15 and 16 is constant if the derivative $\Theta\Delta_r/\Theta r$ is constant, which is the case for example if the microlenses of the microlens fields 15 and 16 are spaced from each other at a constant, differing lens spacing. That is the case for instance in the example shown in FIG. 3*a* where the microlenses 21 and 22 are respectively spaced from each other at a constant lens spacing $p_1$ and $p_2$ and, as shown in FIG. 3*c*, are oriented relative to each other in accordance with a periodic raster.

If that condition is satisfied an integral image is produced and the imaging function of the system shown in FIG. 3*a* approximately corresponds to that of a conventional lens system consisting of two macroscopic lenses 21 and 22.

If now that specific case in which the microlenses of the microlens field 15 are spaced from each other at the constant lens spacing $p_1$ and the lenses of the microlens field 16 are spaced from each other at the constant lens spacing $p_2$ is further viewed, the resulting relationships, based on the scenario shown in FIG. 3*b*, are as follows:

FIG. 3*b* shows the microlens fields 15 and 16, a point on the optical axis, which is spaced at a distance g from the microlens field 16 and which is imaged by the first microlens field onto a set of points which are spaced at a distance $s_1$ from the microlens field and involve a lateral spacing $y_n$. Those points are at a distance $s_2$ from the microlens field 16 and are imaged at a distance b onto a point on the optical axis.

In order for the situation shown in FIG. 3*b* to occur, the following condition must be met:

$$np_1\frac{g-s_1}{g} = np_2\frac{b-s_2}{b}$$

If the system of the microlens fields 15 and 16 is viewed as a system of thin lenses, then for the focal length of the system, with the incidence of light from the side of the microlens field 15, the focal length is:

$$F = f_2\frac{p_1}{(p_2-p_1)}$$

and with the incidence of light from the side of the microlens field 16 the focal length is:

$$F' = f_1\frac{p_2}{(p_1-p_2)}.$$

In that way the imaging function, with the incidence of light from the side of the microlens field 15, can be described as follows:

$$\frac{1}{F} = \frac{f_1}{f_2}\frac{1}{(f_1+g)} + \frac{p_2}{p_1}\frac{1}{(b-f_2)}.$$

In contrast to a normal lens the imaging function generated by the microlens fields 15 and 16, in the case of using microlenses of positive focal length for the microlens fields 15 and 16 (Kepler telescope) thus involves the following particularities in relation to a "conventional" lens system:

When viewing an object from the side of the microlens field 15, a different image is presented than when viewing the object from the side of the microlens field 16. Depending on the respective viewing direction involved the sign of the focal length changes. In addition, with a negative focal length, there is a real image for object distances s with $|s|<F\ f_1/f_2$. With a positive focal length the image distance is always less than the focal length. In addition an upright image is generated.

In the situation where the microlenses of the microlens field 15 have a positive focal length and the microlenses of the microlens field 16 have a negative focal length (Gallileo telescope), the differences in relation to the imaging function of a conventional lens are as follows:

The sign of the focal length of the system does not change when the system is rotated, as in the case of a conventional lens. The focal length however is nonetheless dependent on the viewing direction. The system behaves like a conventional lens in which the object is in a medium with a refractive index $f_1/f_2$.

Instead of using microlens fields for the microlens fields 15 and 16 which meet the above-described conditions and which thus upon the co-operation thereof generate an optical function similar to a conventional lens, it is also possible to use microlens fields which do not satisfy the above-indicated conditions. Thus it is for example possible for the lens spacing of the microlenses of one or both microlens fields to continuously change in region-wise manner so that attractive and impressive distortion effects are produced. Equally it is possible for the focal length of the microlenses of a microlens field to be continuously changed at least in a region of the microlens field, whereby equally distortion effects of that kind can be produced. If the refractive index of the microlens and thus the effective focal length of the microlens or the spacing of the microlenses in both microlens fields 15 and 16 is changed at least in region-wise manner, the resulting imaging function changes upon lateral displacement of the two microlens fields 15 and 16 relative to each other, which can serve as a further security feature in terms of verifying the security document 1.

In addition it is also possible to provide in the microlens fields 15 and 16 regions in which the focal length of the microlenses and the spacing of the microlenses is admittedly constant but different from adjacent regions. If only one of the two microlens fields 15 and 16 is of such a configuration that affords a imaging function which corresponds to the plurality of different conventional lenses arranged in mutually juxtaposed relationship. In that case the optical imaging function which applies in respect of the individual subregions is defined by the above-described relationships. If both microlens fields 15 and 16 are of such a configuration, the optical imaging function changes upon lateral displacement of the two microlens fields 15 and 16 relative to each other, which can be used as a further security feature for verifying the security document.

The lens spacing of the microlens fields 15 and 16 is preferably so selected that the partial rays generated by splitting an incident light ray are of a diameter which is below the resolution capability of the human eye. Preferably the spacing of the microlens fields 15 and 16 is accordingly in a range of between 250 μm and 25 μm. That ensures that the integral image generated by the microlens fields 15 and 16 has a good resolution. If low demands are made on the optical quality of the imaging function generated by the microlens fields 15 and 16 it is also possible to increase the lens spacing of the microlenses of the microlens fields 15 and 16.

The detailed structure of the optical element arranged in the region of the transparent window 12, with the microlens field 15, will now be described with reference to FIGS. 3*c* and 4.

Figure 4:
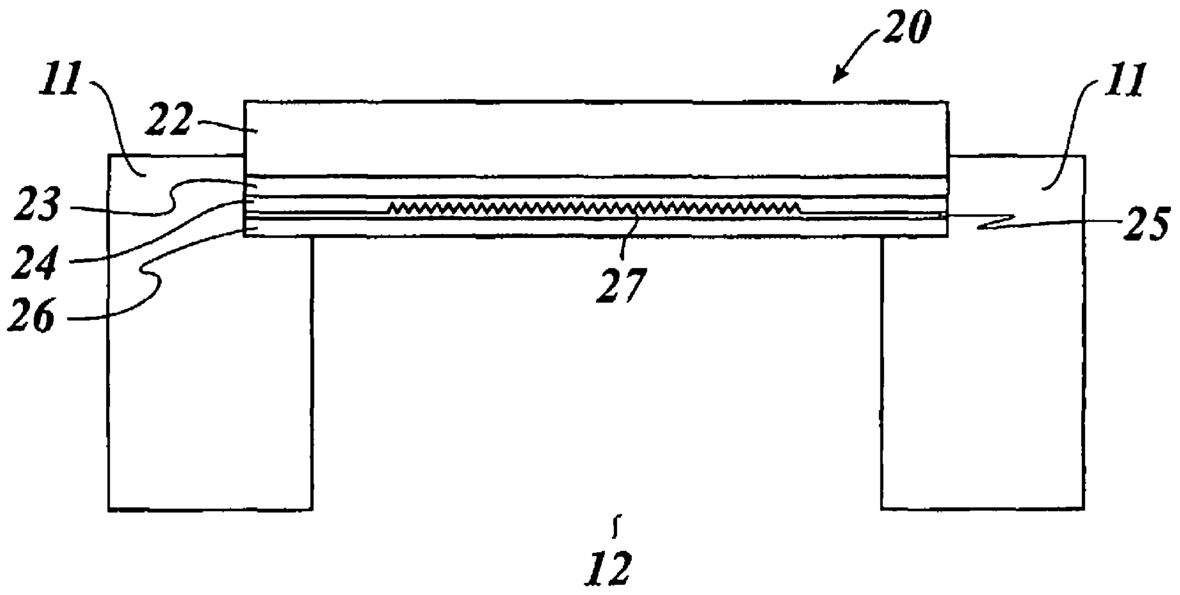
FIG. 4 shows a sectional view of a portion of the security document of FIG. 1.

FIG. 4 shows the carrier 11 which comprises a paper material of a thickness of about 100 μm and which in the region of the transparent window 12 has an opening produced by means of a stamping or cutting operation. A film element 20 is applied preferably with heat and pressure to the paper material of the carrier 11, by an adhesive layer of the film element 20 being activated by heat and pressure. The depression shown in FIG. 4 is produced at the same time in the region of the optical element 20, by the applied pressure.

The film element 20 comprises a carrier film 22, a bonding layer 23, a replication lacquer layer 24, an optical separation layer 25 and an adhesive layer 26.

The carrier film 22 comprises a PET or BOPP film of a layer thickness of 10 to 200 μm. The function of the carrier film 22 is to provide for the necessary stability for bridging over the opening in the carrier 11. The bonding layer 23 is of a thickness of 0.2 to 2 μm and is applied to the carrier film 22 by means of a printing process. The replication lacquer layer 24 comprises a thermoplastic or crosslinked polymer in which a relief structure 27 is replicated by means of a replication tool under the action of heat and pressure or by UV replication. The optical separation layer 25 comprises a material whose refractive index is markedly different from that of the replication lacquer layer 24. Preferably in this case the optical separation layer 25 comprises an HRI or LRI layer (HRI=high refraction index, LRI=low refraction index), so that the difference in refractive index between the replication lacquer layer 24 and the optical separation layer 25 is particularly high. In addition it is possible to achieve a refractive index which is as high as possible for the replication lacquer layer 24 by the polymers of the replication lacquer layer being doped with nanoparticles or by using a polymer with a high refractive index, for example a photopolymer, for the replication lacquer layer 24. It is further advantageous for the optical separation layer to be as thick as possible. In that way it is possible to reduce the relief depth of the relief structure 27, which is advantageous in particular when the microlenses of the microlens field 1 are produced in the form of refractive lenses defined by a macroscopic structure.

It is however also possible for the microlens field 15 not to be implemented in a structure which is encapsulated in that way, and thus to dispense with the optical separation layer 25. Furthermore it is also possible for the adhesive layer 26 to be eliminated in the region of the relief structure 27 so that the relief structure 27 comes directly into contact with the air.

The relief structure 27 is a relief structure which implements the microlens field 15 by means of a plurality of macroscopic lenses disposed in mutually juxtaposed relationship, in the form indicated in FIG. 3*c*. It is however also possible for the relief structure 27 to be a diffractive relief structure which by optical-diffraction means produces the effect of a microlens field comprising convex or concave microlenses.

The effect of a convex or concave lens can be generated in that case by a diffractive relief structure which changes continuously in respect of its grating frequencies and optionally further grating constants, over a surface region. By way of example it is possible by optical-diffraction means to produce the effect of a convex lens in which, starting from a paraboloidal central portion at the centre of the lens, there is provided a plurality of grooves which are arranged in a ring configuration in relation to that central portion and the grating frequency of which continuously increases from the central portion. The effect of a concave lens can be produced by optical-diffraction means by an inverse structure. In order by optical-diffraction means to produce the effect of microlens field having a plurality of microlenses arranged in mutually juxtaposed relationship, a plurality of relief structures of that kind are arranged in mutually juxtaposed relationship in chessboard-like manner. Furthermore it is also possible for those relief structures to be arranged hexagonally in juxtaposed relationship. Furthermore attention is directed in regard to the configuration of such "diffractive lenses" to the Chapter . . . of the book "Micro-optics", Hans Peter Herzig, Taylor and Francis publishers, London, 1997.

The use of a "diffractive" microlens field of that kind has the advantage that the relief depth of the relief structure 27, which is necessary to produce the microlens field, can be reduced, which is advantageous in particular with a greater lens spacing of the microlenses of the microlens field 15 specifically with short focal lengths.

The structure shown in FIG. 4 and the arrangement of the optical element 20 has the advantage that the surface structure generating the microlens field is very substantially protected from damage or manipulation operations.

Further embodiments of the invention will now be described with reference to FIG. 5.

Figure 5:
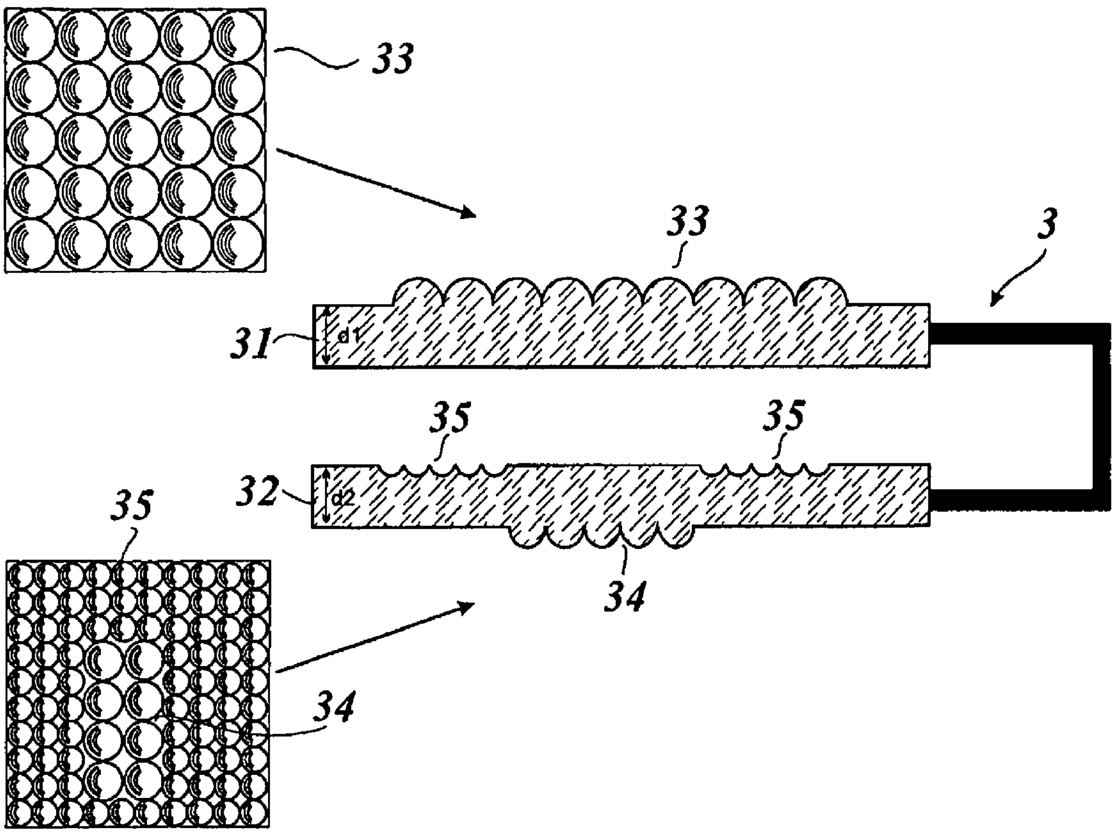
FIG. 5 shows a diagrammatic view of a further security document according to the invention.

FIG. 5 shows a diagrammatic view of a viewing situation of a security document 3 in which two microlens fields 31 and 32 arranged in transparent windows of the security document 3 are held in overlapping relationship to check the security document 3. The microlens field 31 has a region 33 with microlenses arranged in accordance with a periodic raster, involving a positive focal length. In addition the optical element which implements the microlens field 31 in the region 33 is of such a configuration that the microlens field is at a spacing $d_1$ from the underside of the security document 3.

The microlens field 32 has a region 34 in which a plurality of microlenses with a positive focal length are arranged in accordance with a first raster and it further has a region 35 which surrounds that region and in which a plurality of microlenses with a negative focal length are arranged in accordance with a second periodic raster. Here, the configuration of the optical element implementing the microlens field 32 spaces the microlenses of the region 34 from the underside of the security document 3 at a spacing $d_2$.

The optical element in which the microlens fields 31 and 32 are implemented comprises in this case a thermoplastic film body, for example a PET or BOPP film of a layer thickness of 10 to 50 μm into which the surface structures generating the microlens fields 31 and 32 are introduced by means of a replication tool by heat and pressure, as shown in FIG. 5. Under some circumstances that film body is then also coated with further layers, for example with an optical separation layer or a protective lacquer layer, and then applied in the region of the transparent optical window to the carrier of the security document 3. It is however also possible for the optical elements of FIG. 5 to be constructed like the optical elements 20 of FIG. 4.

If now the security document 3 is folded and the microlens fields 31 and 32 are brought into overlapping relationship, a first optical imaging function is generated in the region in which the region 33 and the region 34 of the microlens fields 31 and 32 respectively overlap and a second optical imaging function is generated in the region in which the regions 33 and 35 of the microlens fields 31 and 32 respectively overlap. In this case the first optical imaging function has the above-discussed properties (Kepler telescope) in dependence on the focal lengths of the microlenses of the regions 33 and 34 and on the spacing of the microlenses of the regions 33 and 34, whereas the second optical imaging function which is determined by the focal lengths of the microlenses of the regions 33 and 35 and the spacing of the microlenses in the regions 33 and 35 has properties which are greatly different therefrom (Gallileo telescope). In this case the spacings $d_1$ and $d_2$ are preferably so selected that, when the undersides of the security document 3 bear directly against each other, the sum of the spacings $d_1$ and $d_2$ corresponds to the sum of the focal lengths of the microlenses in the regions 33 and 34 and the spacing $d_1$ corresponds to the sum of the focal lengths of the microlenses in the regions 33 and 35. By way of example the following values can be adopted for the spacings $d_1$ and $d_2$ and for the focal lengths of the microlenses in the regions 33, 34 and 35: $d_1=d_2=1$ mm, f33=0.125 mm, f34=0.075 mm and f35=−0.025 mm, wherein f33 denotes the focal length of the microlenses in the region 33, f34 denotes the focal length of the microlenses in the region 34 and f35 denotes the focal length of the microlenses in the region 35.

In addition the imaging function generated by the mutually overlapping microlens fields 31 and 32 is also determined by the spacing of the transparent window overlapping them, wherein that change in the optical imaging function by a change in the spacing of the optical windows from each other serves as an additional striking optical security feature. In this respect the above-described selection of the spacings $d_1$ and $d_2$ ensures that, when the optical elements bear directly against each other, clearly defined and mutually matched first and second imaging functions are generated.

In that case the region 34 preferably forms a pattern region which is shaped in the form of a pattern, for example a graphic representation or text, so that regions with different imaging functions contain additional encoded information. Such a juxtaposition of regions in pattern form with different imaging functions cannot be imitated by a conventional lens system so that optical effects which are easy to remember and which can be imitated only with difficulty using other technologies can be generated by the invention.

Furthermore it is also possible that—as already indicated hereinbefore—not just the microlens field 31 has two regions in which the spacing and/or the focal length of the microlenses differs. It is also possible for the microlens field 31 to be of such a configuration. In that case the optical imaging functions which occur region-wise further also depend on the lateral position of the microlens fields 31 and 32 relative to each other so that upon lateral displacement of the microlens fields 31 and 32 relative to each other the optical imaging function changes and thus different items of information which are encoded in the imaging function are rendered visible depending on the respective lateral position involved.

Figure 6:
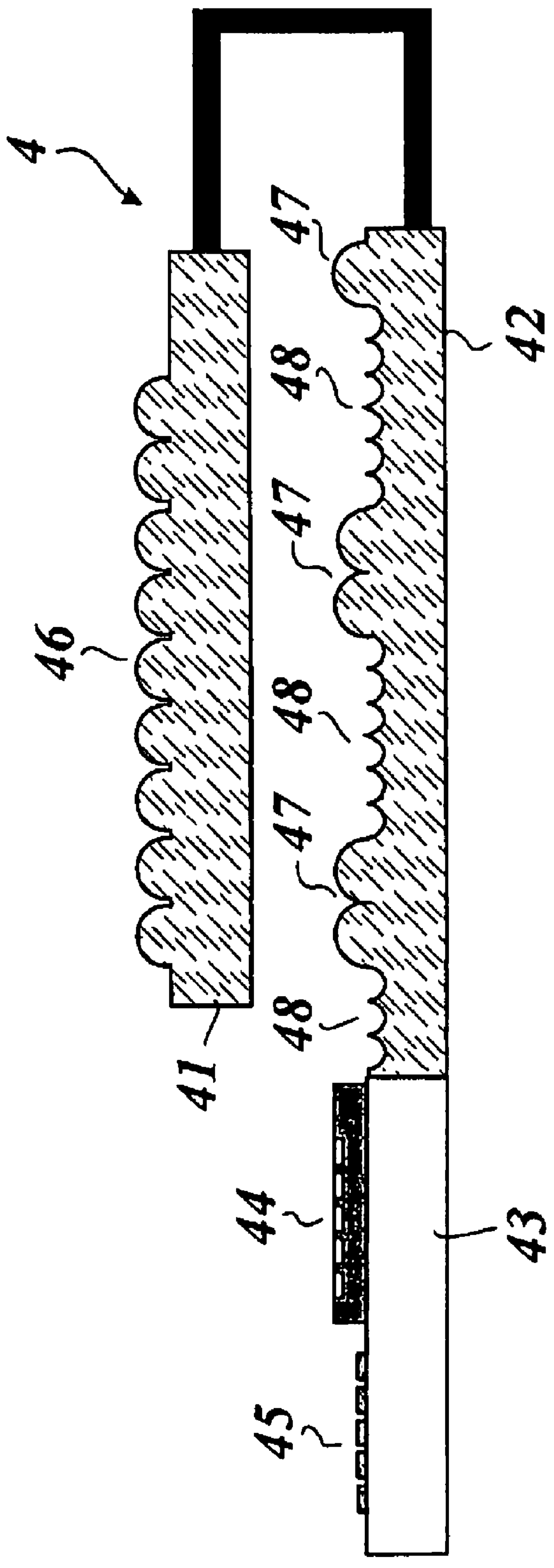
FIG. 6 shows a diagrammatic view of a further security document according to the invention, and FIGS. 7*a* to 7*c* diagrammatically show views of a further security document according to the invention in various viewing situations.

FIG. 6 shows a viewing situation of a security document 4 in which two microlens fields 41 and 42 arranged in transparent optical windows of the security document 4 are held in overlapping relationship, for verification of the security document. In this case the microlens field 41 has in a region 46 a plurality of microlenses of constant focal length which are oriented in relation to a periodic raster. The microlens field 42 has regions 48 and 47 in which the focal length of the microlenses and the lens spacing of the microlenses differs. That arrangement generates the optical effects already described with reference to FIG. 5 upon overlapping of the microlens fields 41 and 42. In addition the security document 4 also has further optical elements 45 and 44 which, as shown in FIG. 6, are applied to the carrier of the security document 4.

The optical element 45 is preferably an imprint in the form of a moiré pattern. In that case the moiré pattern is adapted to the microlens field 41 in such a way that the region 46 of the microlens field 41 can function as a moiré analyser and thus, upon overlapping of the optical element 45 with the microlens field 41, a moiré image which is encoded in the moiré pattern of the optical element 45 appears. In that case the microlenses of the microlens field 41 form a moiré magnifier and moiré-magnifies an encoded (repetitive small) item of information, whereby a concealed (for example phase-encoded) item of information is rendered visible.

Furthermore it is also possible for the optical element 45 to be an imprint in the form of a moiré analyser and for the microlens field 41 to form a moiré pattern in which a concealed (for example phase-encoded) moiré image is encoded.

In that respect the term moiré pattern is used to denote a pattern which is formed from repeating structures and which, upon superimposition with or when viewed through a further pattern which is formed by repeating structures and which acts as a moiré analyser, presents a fresh pattern, namely a moiré image, which is concealed in the moiré pattern. In the simplest case that moiré effect arises out of the superpositioning of two line rasters, wherein the one line raster is phase-displaced region-wise to produce the moiré image. Besides a linear line raster it is also possible for the lines of the line raster to have curved regions, for example to be arranged in a wave or circular shape. Furthermore it is also possible to use a moiré pattern which is built up on two or more line rasters which are turned relative to each other or which are superpositioned. Decoding of the moiré image in a line raster of that kind is also effected by region-wise phase displacement of the line raster, wherein two or more different moiré images can be encoded in a moiré pattern of that kind. Furthermore it is also possible to use moiré patterns and moiré analysers which are based on the so-called "Scrambled Indica®" technology or on a hole pattern (round, oval or angular holes of various configurations).

The optical element 44 is a reflective optical element, for example a partial metallisation in the form of a moiré pattern, or a partially metallised diffractive structure. In this case the optical element 44 can also have a field or array of reflective microlenses which present attractive optical effects in reflection when they are overlapped by the microlens field arranged in the region 46.

Figure 7A:
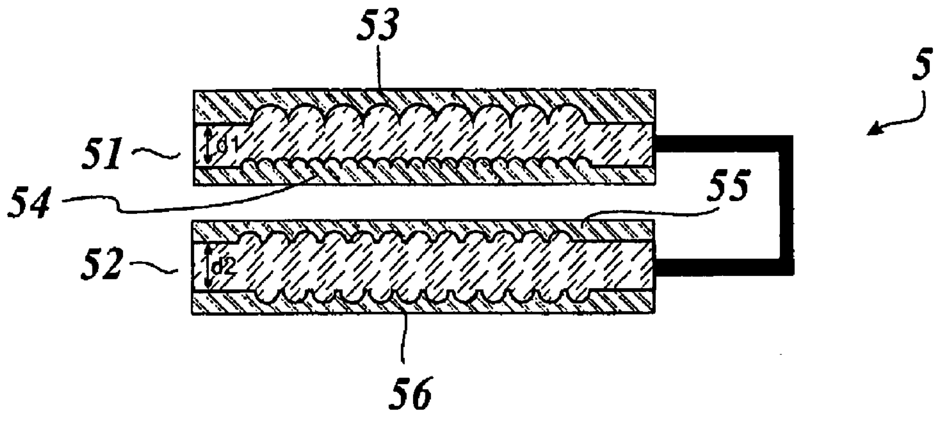
Figure 7B:
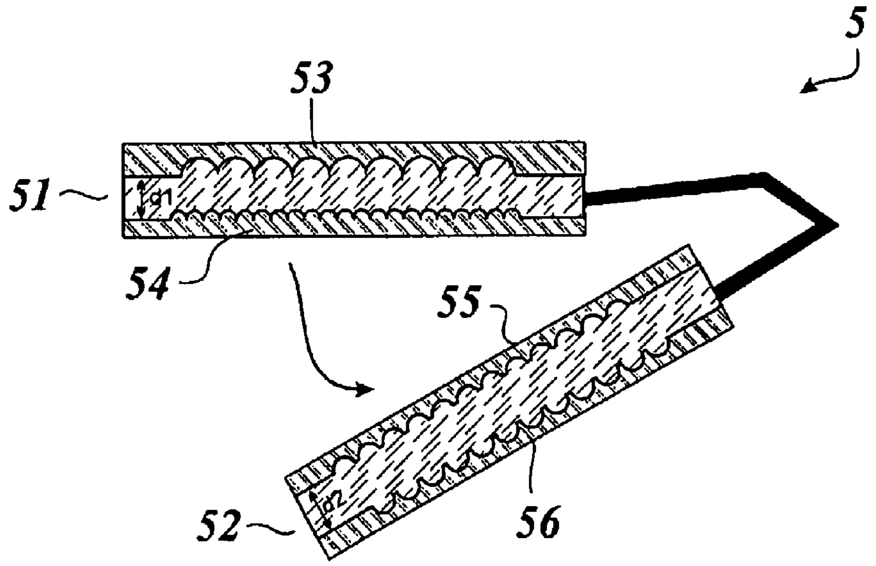
Figure 7C:
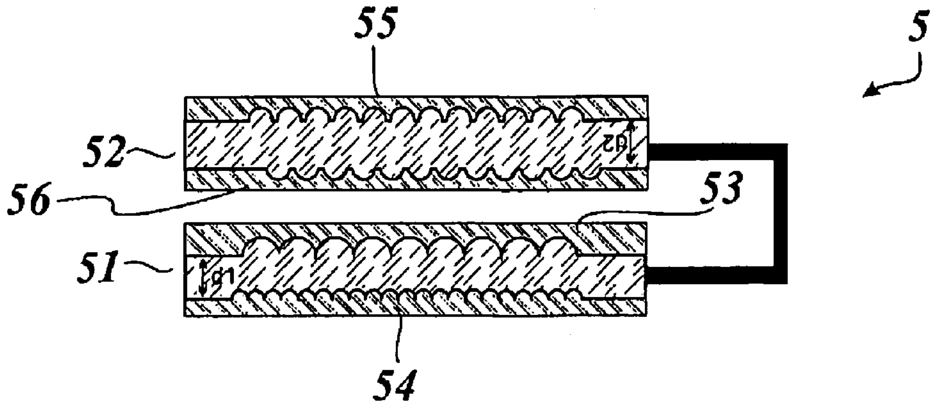

FIGS. 7*a* to 7*c* show various viewing situations of a security document 5. In the viewing situation shown in FIG. 7*a* the security document 5 is folded so that transparent windows are in overlapping relationship, with microlens fields 51 and 52 of the security document 5. As indicated in FIG. 7*b* now the security document 5 is folded in the other direction so that, in the viewing situation shown in FIG. 7*c*, it is not the undersides of the microlens fields 51 and 52 that bear against each other as shown in FIG. 7*a*, but it is now the top sides of the microlens fields 51 and 52 that bear against each other.

As indicated in FIGS. 7*a* to 7*c* the microlens fields 51 and 52 each have a respective lens body of a thickness $d_1$ and $d_2$ respectively and are structured on both sides so that the optical function of the microlens field 51 arises out of the co-operation of two superpositioned microlens subfields 53 and 54 in accordance with the relationships described with reference to FIGS. 3*a* to 3*c*. In a corresponding fashion the microlens field 52 is formed by two microlens subfields 55 and 56 arranged in mutually juxtaposed relationship. As is further indicated in FIGS. 7*a* to 7*c* the lens body of the microlens fields 51 and 52 is encapsulated and thus covered on both sides by an optical separation layer or a protective layer.

In this case, as shown in FIG. 7*a*, the microlens subfields 54 and 55 involve inverse geometry so that the optical imaging functions generated by the microlens subfields 54 and 55 extinguish each other. In the viewing situation shown in FIG. 7*a* accordingly an optical imaging function is generated as an optical effect which arises out of the superpositioning of the microlens subfields 53 and 56, that is to say the lens spacing and the focal length of those microlens fields. That is not the case in the viewing situation of FIG. 7*c* so that this viewing situation does not involve the generation of an effect similar to a conventional lens.

The invention claimed is:

1. A security document comprising a first transparent window in which a first optical element is arranged and a second transparent window in which a second optical element is arranged, wherein the first transparent window and the second transparent window are arranged on a carrier of the security document in mutually spaced relationship in such a way that the first and the second optical elements can be brought into overlapping relationship with each other, and wherein the first optical element has a first transmissive microlens field comprising an array of microlenses having a lens spacing and the second optical element has a second transmissive microlens field comprising an array of microlenses having a lens spacing, wherein the lens spacing of the microlenses of the first and second microlens fields is less than 300 μm and a first optical effect is produced upon overlap of the second microlens field with the first microlens field, and wherein the first microlens field has a region in which the optical axes of the microlenses of the first microlens field are spaced in parallel relationship in accordance with a first periodic raster at a constant lens spacing and the second microlens field has a region in which the optical axes of the microlenses of the second microlens field are spaced in parallel relationship in accordance with a second periodic raster at a constant lens spacing, and wherein the constant lens spacing of the lenses of the first microlens field differs from the constant lens spacing of the microlenses of the second microlens field.

2. A security document according to claim 1, wherein the first and the second transmissive microlens fields are defined by parameters lens spacing of the microlenses and focal length of the microlenses.

3. A security document according to claim 1, wherein the lens spacing of the microlenses of the first microlens field is an integral multiple of the lens spacing of the microlenses of the second microlens field.

4. A security document according to claim 1, wherein the first microlens field has a plurality of microlenses of positive focal length and the second microlens field has a plurality of microlenses of positive focal length.

5. A security document according to claim 1, wherein the first microlens field has a plurality of microlenses of positive focal length and the second microlens field has a plurality of microlenses of negative focal length.

6. A security document according to claim 1, wherein the focal length of the microlenses of the first and second microlens fields are so selected that the microlenses of the first and second microlens fields upon superpositioning of the first and second transparent windows are spaced from each other in accordance with the sum of their focal lengths.

7. A security document according to claim 1, wherein the first and/or the second microlens field has two or more regions with a differing lens spacing of the microlenses.

8. A security document according to claim 1, wherein the first and/or the second microlens field has two or more regions with a differing focal length of the microlenses.

9. A security document according to claim 1, wherein the first and/or the second microlens field has one or more regions in which the lens spacing of the microlenses is phase-displaced with respect to a periodic base raster.

10. A security document according to claim 2, wherein the first and/or the second microlens field has a region in which the lens spacing of the microlenses steadily changes.

11. A security document according to claim 1, wherein the first and/or the second microlens field has a region in which the lens spacing of the microlenses steadily changes.

12. A security document according to claim 1, wherein the security document has an opaque third optical element, wherein upon overlapping of the first or the second optical element with the third optical element a second optical effect is produced.

13. A security document according to claim 12, wherein the third optical element has a concealed moiré pattern.

14. A security document according to claim 1, wherein the first and/or the second optical element has a replication lacquer layer into which is shaped a relief structure which forms the first or the second microlens field respectively.

15. A security document according to claim 1, wherein the microlenses of the first and/or the second microlens field are formed by a relief structure which has an optical-diffraction effect and which by optical-diffraction means produces the effect of a microlens field and the structure depth of which is at most 10 μm.

16. A security document according to claim 1, wherein the first and/or the second optical element comprises the transfer layer of a transfer film.

17. A security document according to claim 1, wherein the carrier of the security document comprises a paper material into which the transparent window is introduced.

* * * * *